(12) United States Patent
Powell et al.

(10) Patent No.: US 11,920,820 B2
(45) Date of Patent: Mar. 5, 2024

(54) VARIABLE SPEED AIRFLOW ZONE BOARD

(71) Applicant: CARRIER CORPORATION, Palm Beach Gardens, FL (US)

(72) Inventors: Bradley D. Powell, Greenwood, IN (US); Gerald P. Hunt, Fishers, IN (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 158 days.

(21) Appl. No.: 17/531,345

(22) Filed: Nov. 19, 2021

(65) Prior Publication Data

US 2023/0160599 A1 May 25, 2023

(51) Int. Cl.
| | |
|---|---|
| *F24F 11/88* | (2018.01) |
| *F24F 11/30* | (2018.01) |
| *F24F 11/74* | (2018.01) |
| *F24F 11/77* | (2018.01) |
| *G05B 15/02* | (2006.01) |
| *F24F 110/10* | (2018.01) |

(52) U.S. Cl.
CPC ........... *F24F 11/88* (2018.01); *F24F 11/30* (2018.01); *F24F 11/74* (2018.01); *F24F 11/77* (2018.01); *G05B 15/02* (2013.01); *F24F 2110/10* (2018.01)

(58) Field of Classification Search
CPC .. F24F 11/88; F24F 11/30; F24F 11/74; F24F 11/77; F24F 2110/10; G05B 15/02
See application file for complete search history.

(56) References Cited

U.S. PATENT DOCUMENTS

| | | | | |
|---|---|---|---|---|
| 4,530,395 | A | * | 7/1985 | Parker ...................... F24F 11/61 236/1 C |
| 4,931,948 | A | * | 6/1990 | Parker ...................... F24F 11/88 236/1 C |
| 6,964,174 | B2 | | 11/2005 | Shah |
| 2005/0155367 | A1 | * | 7/2005 | Shah ........................ F24F 13/02 165/205 |
| 2007/0063059 | A1 | * | 3/2007 | Votaw ...................... F24F 11/67 165/205 |
| 2007/0277542 | A1 | * | 12/2007 | Rao .......................... F24F 11/76 62/186 |
| 2009/0101725 | A1 | * | 4/2009 | Dolan ...................... F25B 49/02 417/44.1 |
| 2018/0352672 | A1 | * | 12/2018 | Glander ............... H05K 7/1474 |
| 2019/0195528 | A1 | * | 6/2019 | Puranen ................... F24F 11/81 |
| 2019/0257545 | A1 | * | 8/2019 | Ko ........................... F24F 11/56 |

OTHER PUBLICATIONS

MZP4 Installation and Operating Instructions, Trolex Corporation & ZoneFirst (2012) (Year: 2012).*

* cited by examiner

*Primary Examiner* — Alicia M. Choi
(74) *Attorney, Agent, or Firm* — CANTOR COLBURN LLP

(57) ABSTRACT

A zone board for a heating, ventilation, and air-conditioning (HVAC) system including: a controller connector configured to electrically connect a controller to the zone board, the controller being configured to control operation of the HVAC system; a unit connector configured to electrically connect an indoor air handler to the zone board; and a thermostat connector configured to electrically connect a thermostat in a first zone to the zone board, wherein the thermostat connector is a 24-volt printed circuit board connector.

6 Claims, 3 Drawing Sheets

VARIABLE SPEED AIRFLOW ZONE BOARD

BACKGROUND

The embodiments herein generally relate to a heating, ventilation, and air conditioning (HVAC) system and more specifically to a zone board for an HVAC system.

Multi-zone HVAC systems are known, and include a component(s) for changing the temperature and condition of air (a furnace, air conditioner, heat pump, etc.). For simplicity, these components may be referred to collectively as a temperature changing component. Also, an indoor air handler drives air from the temperature changing component through supply ducts to several zones within a building. Each of the supply ducts typically have dampers that may be controlled to restrict or allow flow of air into each zone to achieve a desired temperature.

In these systems, sizes of the ducts leading to each of the zones may vary due to restrictions, etc., which could occur along the length of the ducts. Thus, while modern HVAC systems are being adapted for the consideration of sophisticated controls, accurately controlling the flow of air into each of the several zones would require knowledge of the relative sizes of the ducts. As an example, if there were two ducts leading to two zones, with one of the two ducts being smaller than the other, the smaller duct would tend to receive less airflow than the larger duct. Knowledge of the sizes of the ducts is thus important, to provide the ability to achieve close control over airflow to these zones. Current systems require multiple sensor inputs (for temperature, humidity, etc.) and setpoints from each zone to control the temperature changing component and the zone dampers, which may be incompatible with current thermostats.

BRIEF SUMMARY

According to one embodiment, a zone board for a heating, ventilation, and air-conditioning (HVAC) system is provided. The zone board including: a controller connector configured to electrically connect a controller to the zone board, the controller being configured to control operation of the HVAC system; a unit connector configured to electrically connect an indoor air handler to the zone board; and a thermostat connector configured to electrically connect a thermostat in a first zone to the zone board, wherein the thermostat connector is a 24-volt printed circuit board connector.

In addition to one or more of the features described above, or as an alternative, further embodiments may include a damper connector configured to electrically connect a damper for the first zone to the zone board.

According to an embodiment, a heating, ventilation, and air-conditioning (HVAC) system is provided. The HVAC system including: a controller; an indoor air handler; a thermostat for a first zone; and a zone board including: a controller connector configured to electrically connect the controller to the zone board, the controller being configured to control operation of the HVAC system; a unit connector configured to electrically connect the indoor air handler to the zone board; and a thermostat connector configured to electrically connect the thermostat to the zone board, wherein the thermostat connector is a 24-volt printed circuit board connector.

In addition to one or more of the features described above, or as an alternative, further embodiments may include a damper for the first zone, wherein the zone board further includes a damper connector configured to electrically connect the damper for the first zone to the zone board.

In addition to one or more of the features described above, or as an alternative, further embodiments may include that the indoor air handler further includes a variable speed blower.

In addition to one or more of the features described above, or as an alternative, further embodiments may include that the thermostat is a 24-volt thermostat.

According to another embodiment, a computer implemented method of operating a heating, ventilation, and air-conditioning (HVAC) system is provided. The computer implemented method includes: receiving an electronic signal from a thermostat for a first zone via a 24-volt thermostat connector in a zone board; and commanding an indoor air handler to provide conditioned air to the first zone in accordance with the electronic signal received from the thermostat.

In addition to one or more of the features described above, or as an alternative, further embodiments may include activating a variable speed blower of the indoor air handler to provide the conditioned air to the first zone in accordance with the electronic signal received from the thermostat.

In addition to one or more of the features described above, or as an alternative, further embodiments may include actuating a damper for the first zone to provide the conditioned air to the first zone in accordance with the electronic signal received from the thermostat.

In addition to one or more of the features described above, or as an alternative, further embodiments may include that actuating a damper for a second zone to provide the conditioned air to the first zone in accordance with the electronic signal received from the thermostat.

In addition to one or more of the features described above, or as an alternative, further embodiments may include performing a duct assessment.

In addition to one or more of the features described above, or as an alternative, further embodiments may include that the duct assessment is performed to determine how much air to deliver to each zone.

In addition to one or more of the features described above, or as an alternative, further embodiments may include that the duct assessment is performed prior to receiving the electronic signal from the thermostat for the first zone via the 24-volt thermostat connector in the zone board.

In addition to one or more of the features described above, or as an alternative, further embodiments may include that the duct assessment is performed to measure and calculate relative zone duct sizes.

Technical effects of embodiments of the present disclosure include utilizing 24-volt printed circuit board connectors to connect 24-volt thermostats to a zone board to better control distribution of air to different zones.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

Figure 1:
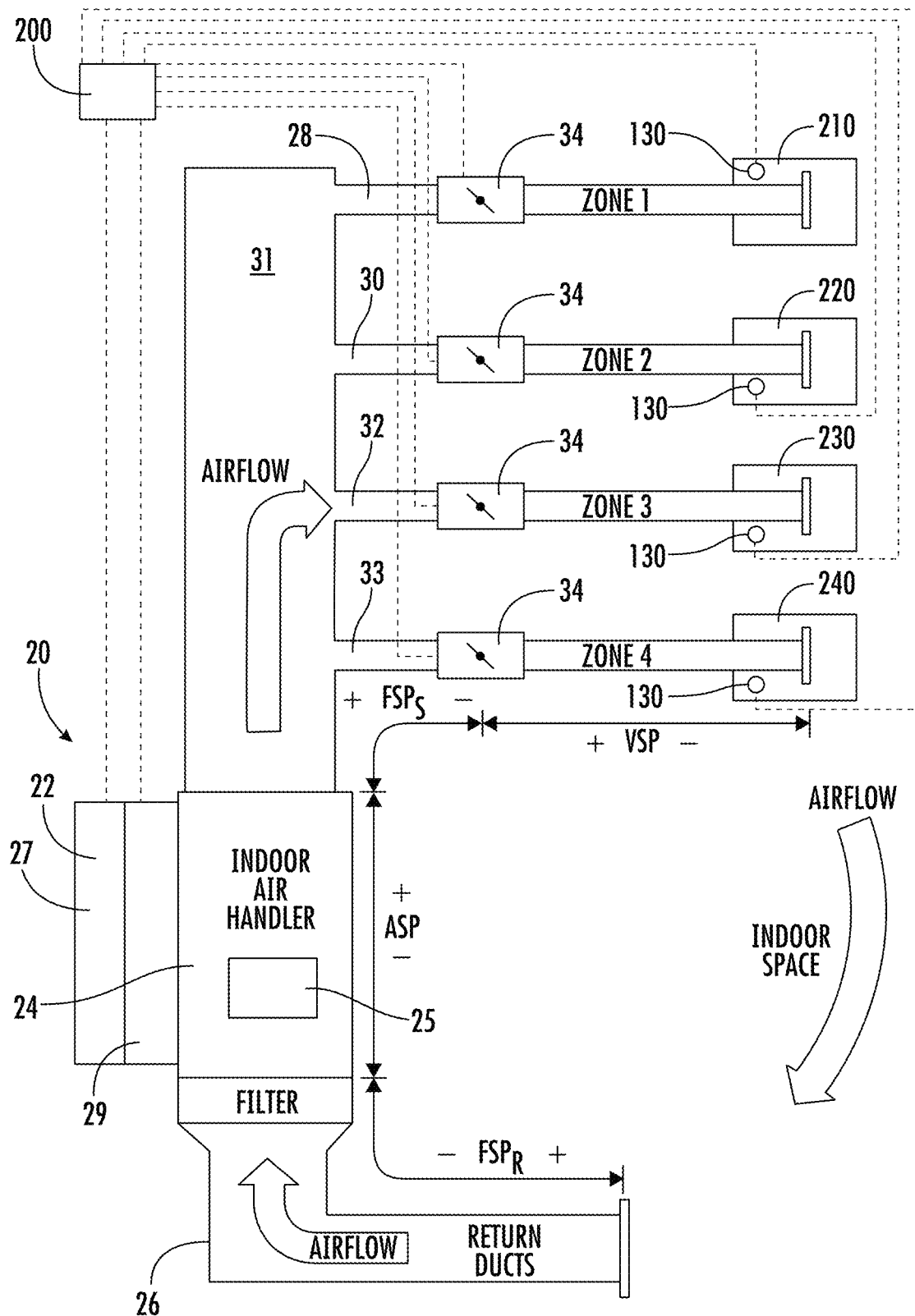
FIG. 1 is a perspective view of an exemplary heating, ventilation, and air-conditioning (HVAC) system, according to an embodiment of the present disclosure.

Referring now to FIG. 1, a heating, ventilation, and air-conditioning (HVAC) system 20 is illustrated in accordance with an embodiment of the present disclosure. The HVAC system 20 is a multi-zone HVAC system (e.g., including at least four zones, which may be referred to as a first zone 210, a second zone 220, a third zone 230, and a fourth zone 240). A temperature changing component 22 for changing the condition of air, e.g., an indoor unit 29 (furnace/heater coil) and/or an outdoor unit 27 (air conditioning/heat pump), is associated with an indoor air handler 24. The air handler 24 takes air from return ducts 26 and drives the air into a plenum 31, and a plurality of supply ducts 28, 30, 32, 33 associated with distinct zones 210, 220, 230, 240 in a building. The air handler 24 includes a blower 25 (which may be fixed speed or variable speed). As shown, a damper 34 is provided on each of the supply ducts 28, 30, 32, 33.

A controller 200, such as a microprocessor control controls the dampers 34, the temperature changing component 22 (e.g., the outdoor unit 27 and the indoor unit 29), the indoor air handler 24, and also communicates with a thermostat 130 associated with each of the zones 210, 220, 230, 240. It should be appreciated that, in certain instances, these thermostats 130 may replace the typical temperature/humidity inputs and setpoints provided by multiple smart sensors (e.g., one or more temperature sensor and/or humidity sensor) that may be positioned within each zone.

The controller 200 may be an electronic controller including a processor and an associated memory comprising computer-executable instructions (i.e., computer program product) that, when executed by the processor, cause the processor to perform various operations. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium.

The thermostat 130 allows a user to set desired temperature, noise levels, etc. for each of the zones 210, 220, 230, 240 relative to the others. Moreover, the thermostat 130 preferably include a temperature sensor for providing an actual temperature back to the controller 200. The thermostat 130 may be an electronic controller including a processor and an associated memory comprising computer-executable instructions (i.e., computer program product) that, when executed by the processor, cause the processor to perform various operations. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium.

As disclosed, the controller 200 is able to receive configuring information with regard to each of these system components so that controller 200 understands individual characteristics of the elements of the HVAC system 20, which may include, but are not limited to, the temperature changing component 22 (e.g., the outdoor unit 27 and the indoor unit 29), the indoor air handler 24, the variable speed blower 25, supply ducts 28, 30, 32, 33, damper 34, and thermostat 130. Details of this feature may be as disclosed in co-pending U.S. patent application Ser. No. 10/752,628, filed on Jan. 7, 2004, and entitled "Self-Configuring Controls for Heating, Ventilating and Air Conditioning Systems." The disclosure of each of these applications is incorporated herein by reference.

In the prior art, the amount of air driven by the air handler 24 to each of the zones 210, 220, 230, 240 sometimes become excessive. Dampers 34 may be opened or closed to restrict or allow additional airflow into the zones 210, 220, 230, 240. While there are dampers 34 that are driven to either be full open or full closed, the embodiments disclosed herein may include a damper 34 having not only full open and full closed positions, but also several incrementally closed positions. In one example, there are 16 incremental positions for the damper 34 between full open and full closed. As any one of the dampers 34 is closed to reduce conditioning in that zone, additional airflow is driven to the more open of the dampers 34. This may sometimes result in too much air being delivered to one of the zones 210, 220, 230, 240, which can cause excessive temperature change, and undue noise. In the prior art, pressure responsive bypass valves may be associated with the ducting 28, 30, 32, 33 or upstream in plenum 31. The bypass of the air has undesirable characteristics, as it requires additional valves, ducting, etc., and thus complicates assembly. Typically, the bypass air is returned to the temperature changing component 22 through return duct 26. Thus, the air approaching temperature changing component 22 has already been changed away from ambient, and may be too cold or too hot for efficient operation.

For this reason, it would be desirable to find an alternative way of ensuring undue volumes of air do not flow through any of the ducts 28, 30, 32, 33 into the zones 210, 220, 230, 240. It is understood that while the figures and associated description describe four zones 210, 220, 230, 240, the embodiments disclosed herein are also applicable to HVAC systems with more or less than four zones.

Figure 2:
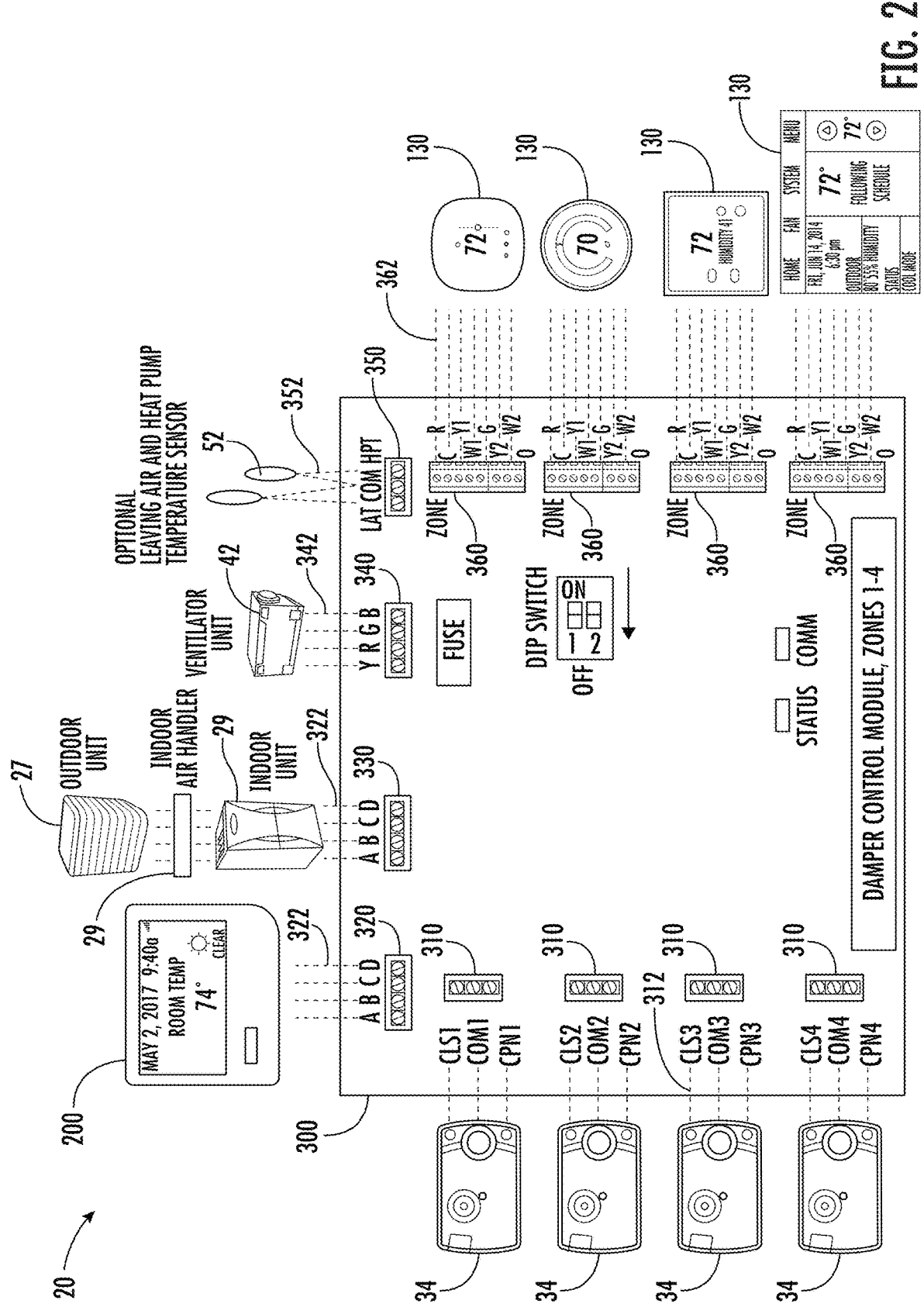
FIG. 2 is a block diagram of an exemplary HVAC system and a zone board for the HVAC system, according to an embodiment of the present disclosure.

Referring now to FIG. 2, a block diagram of the HVAC system 20 is illustrated in accordance with an embodiment of the present disclosure. FIG. 2 illustrates, a zone board 300 for the HVAC system 20. The zone board 300 may be a printed circuit board. The zone board 300 includes a plurality of different connectors for components of the HVAC system 20 to connect to the zone board 300.

The zone board 300 includes one or more damper connectors 310 configured to electrically connect a damper 34 to the zone board 300. The damper connector 310 may be any type of printed circuit board connector known to one of skill in the art. The damper connector 310 may include three communication links 312. It is understood that while three communication links 312 are illustrated in FIG. 2, the embodiments disclosed herein are applicable to any number of communication links 312 for the damper connector 310.

The zone board 300 includes a controller connector 320 configured to electrically connect the controller 200 to the zone board 300. The controller connector 320 may be any type of printed circuit board connector known to one of skill in the art. The controller connector 320 may include four communication links 322. It is understood that while four communication links 322 are illustrated in FIG. 2, the embodiments disclosed herein are applicable to any number of communication links 322 for the controller connector 320.

The zone board 300 includes a unit connector 330 configured to electrically connect the indoor air handler 24, the indoor unit 29, and/or the outdoor unit 27 to the zone board 300. The unit connector 330 may be any type of printed circuit board connector known to one of skill in the art. The unit connector 330 may include four communication links 332. It is understood that while four communication links 332 are illustrated in FIG. 2, the embodiments disclosed herein are applicable to any number of communication links 332 for the unit connector 330.

The zone board 300 includes a ventilator unit connector 340 configured to electrically connect a ventilator unit 42 of the HVAC system 20 to the zone board 300. The ventilator unit connector 340 may be any type of printed circuit board connector known to one of skill in the art. The ventilator unit connector 340 may include four communication links 342. It is understood that while four communication links 342 are illustrated in FIG. 2, the embodiments disclosed herein are applicable to any number of communication links 342 for the ventilator unit connector 340.

The zone board 300 includes a sensor connector 350 configured to electrically connect a temperature sensor 52 of the HVAC system 20 to the zone board 300. The temperature sensor 52 may be configured to measure a temperature of air leaving the indoor air handler 24. The sensor connector 350 may be any type of printed circuit board connector known to one of skill in the art. The sensor connector 350 may include three communication links 352. It is understood that while three communication links 352 are illustrated in FIG. 2, the embodiments disclosed herein are applicable to any number of communication links 352 for the sensor connector 350.

The zone board 300 includes a thermostat connector 360 configured to electrically connect a thermostat 130 of the HVAC system 20 to the zone board 300. FIG. 2 illustrates four thermostats 130 but it is understood that any number of thermostats 130 may be utilized. Each of the thermostats 130 may come from the same manufacturer or different manufacturers. In an embodiment, the thermostat connectors 360 are 24-volt printed circuit board connectors configured to receive 24-volt inputs from the thermostats 130. The thermostat connector 360 may be any type of 24-volt printed circuit board connector known to one of skill in the art. The thermostat connector 360 may include seven communication links 362. It is understood that while seven communication links 362 are illustrated in FIG. 2, the embodiments disclosed herein are applicable to any number of communication links 362 for the thermostat connector 360. The communication links 362 may include communication links R, C, Y1, W1, G, Y2, W2, O, or any other communication link known to one of skill in the art. For example, the communication links may include D1 and D2 for accessory inputs. In an embodiment, the thermostat 130 is a 24-volt thermostat.

Advantageously, by utilizing 24-volt printed circuit board connectors for the thermostat connectors 360 of the controller 200 are configured to receive a great deal more data in the form of electronic signals from each thermostat 130 than previously available. The data or in other words the 24-volt thermostat inputs sent from the thermostat 130 to the thermostat connectors 360 provide discrete signals for a heating call, a cooling call, a continuous fan call, a dehumidification call, a humidify call, and/or a fresh air call. In the conventional zone boards, a zone temperature was provided, and the system determined how to condition the space with heating and/or cooling. The data in the form of electronic signals provided by the thermostats 130 allows the controller 200 to understand how much airflow over a period of time a zone 210, 220, 230, 240 requires and then the controller 200 will command the variable speed blower 25 to deliver that amount of airflow over the period of time, which advantageously may eliminate the need for a bypass valves. In one example, the airflow over a period of time may be measured in cubic feet per minute (CFM).

The HVAC system 20 may perform a duct assessment at or after installation and once per day where the damper 34 for each zone 210, 220, 230, 240 is opened individually and the airflow to each zone 210, 220, 230, 240 is measured. The HVAC system 20 uses this information from the duct assessment in addition to the thermostat calls to determine how much air to deliver to each zone 210, 220, 230, 240 and stage the equipment accordingly. For example, if the HVAC system 20 needs to provide heating or cooling to all zones 210, 220, 230, 240, then the HVAC system 20 will likely run high stage. If only one zone needs heat or cool, the HVAC system 20 may run low stage heating or cooling. The information learned from the duct assessment would help determine what stage the equipment needs to run. The thermostat calls may include but are not limited to, the heat call, the cooling call, the continuous fan call, the dehumidification call, the humidify call, and/or the fresh air call.

Figure 3:
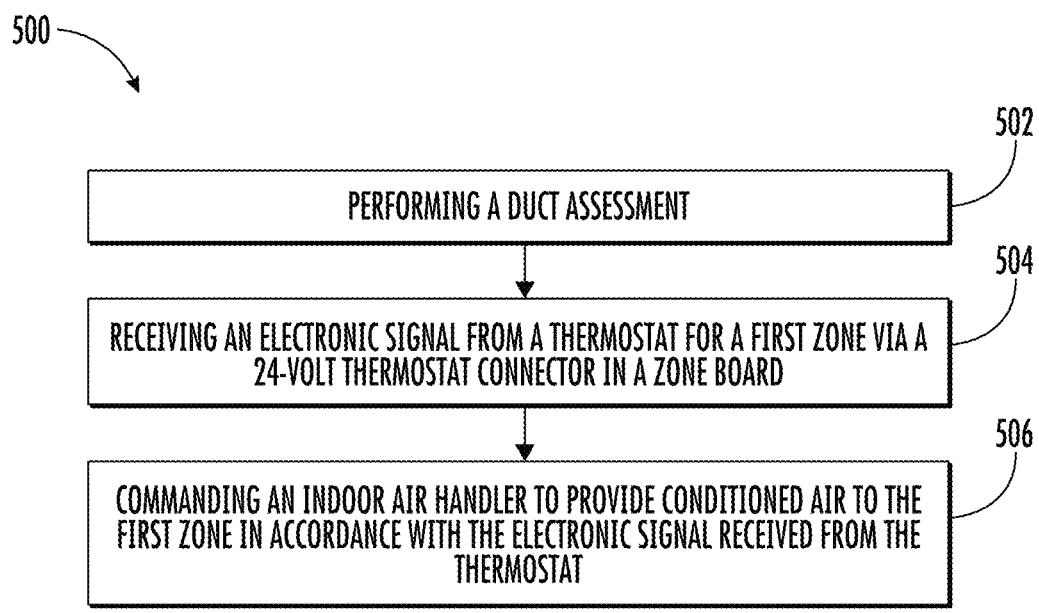
FIG. 3 is a flow diagram illustrating an exemplary computer implemented method of operating an HVAC system, such as the exemplary HVAC system(s) of FIGS. 1 and 2, according to an embodiment of the present disclosure.

Referring now to FIG. 3, with continued reference to FIGS. 1-2, a flow diagram illustrating an exemplary computer implemented method 500 of operating an HVAC system 20 is illustrated in accordance with an embodiment of the present disclosure. In embodiment, the computer implemented method 500 is performed by the controller 200.

At block 504, an electronic signal is received from a thermostat 130 for a first zone 210 via a 24-volt thermostat connector 360 in a zone board 300. In an embodiment, the method 500 may include that a duct assessment is performed prior to block 504 in block 502. The duct assessment may be performed to measure and calculate relative zone duct sizes. As previously discussed, during the duct assessment the damper 34 for each zone 210, 220, 230, 240 is opened individually and the airflow to each zone 210, 220, 230, 240 is measured. The HVAC system 20 uses this information from the duct assessment in addition to the thermostat calls to determine how much air to deliver to each zone 210, 220, 230, 240 and stage the equipment accordingly. The thermostat calls may include but are not limited to, the heat call, the cooling call, the continuous fan call, the dehumidification call, the humidify call, and/or the fresh air call. It is understood, that block 50 is optional, and may or may not be included in the method 500.

At block 506, an indoor air handler 24 is commanded to provide conditioned air to the first zone 210 in accordance with the electronic signal received from the thermostat 130. Block 506 may further include that a variable speed blower 25 of the indoor air handler 24 is activated to provide conditioned air to the first zone 210 in accordance with the electronic signal received from the thermostat 130.

Block 506 may also include that a damper 34 for the first zone 210 is actuated to provide conditioned air to the first zone 210 in accordance with the electronic signal received from the thermostat 130. The damper 34 may be opened fully or opened partially to provide the conditioned air to the first zone 210.

Block 506 may also include that a damper 34 for a second zone 220 is actuated to provide conditioned air to the first zone 210 in accordance with the electronic signal received from the thermostat 130. The damper 34 for the second zone 220 may be closed fully or closed partially to provide the conditioned air to the first zone 210.

While the above description has described the flow process of FIG. 3 in a particular order, it should be appreciated that unless otherwise specifically required in the attached claims that the ordering of the steps may be varied.

As described above, embodiments can be in the form of processor-implemented processes and devices for practicing those processes, such as processor. Embodiments can also be in the form of computer program code (e.g., computer program product) containing instructions embodied in tangible media (e.g., non-transitory computer readable medium), such as floppy diskettes, CD ROMs, hard drives, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes a device for practicing the exemplary embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A computer implemented method of operating a heating, ventilation, and air-conditioning (HVAC) system, the computer implemented method comprising:

receiving an electronic signal from a thermostat for a first zone via a 24-volt thermostat connector in a zone board; and commanding an indoor air handler to provide conditioned air to the first zone in accordance with the electronic signal received from the thermostat;

actuating a damper for the first zone to provide the conditioned air to the first zone in accordance with the electronic signal received from the thermostat;

actuating a damper for a second zone having a second thermostat for setting a temperature of the second zone to provide the conditioned air to the first zone in accordance with the electronic signal received from the thermostat.

2. The computer implemented method of claim 1, further comprising:

activating a variable speed blower of the indoor air handler to provide the conditioned air to the first zone in accordance with the electronic signal received from the thermostat.

3. The computer implemented method of claim 1, further comprising:

performing a duct assessment.

4. The computer implemented method of claim 3, wherein the duct assessment is performed to determine how much air to deliver to each zone.

5. The computer implemented method of claim 3, wherein the duct assessment is performed prior to receiving the electronic signal from the thermostat for the first zone via the 24-volt thermostat connector in the zone board.

6. The computer implemented method of claim 3, wherein the duct assessment is performed to measure and calculate relative zone duct sizes.

* * * * *